United States Patent
Cheng et al.

(10) Patent No.: US 11,443,173 B2
(45) Date of Patent: Sep. 13, 2022

(54) HARDWARE-SOFTWARE CO-DESIGN FOR ACCELERATING DEEP LEARNING INFERENCE

(71) Applicant: Baidu USA LLC, Sunnyvale, CA (US)

(72) Inventors: Zhiyu Cheng, Sunnyvale, CA (US); Haofeng Kou, Sunnyvale, CA (US); Yingze Bao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 812 days.

(21) Appl. No.: 16/393,247

(22) Filed: Apr. 24, 2019

(65) Prior Publication Data

US 2020/0342292 A1 Oct. 29, 2020

(51) Int. Cl.
  *G06N 3/063* (2006.01)
  *G06N 3/04* (2006.01)
  *G06F 17/15* (2006.01)

(52) U.S. Cl.
  CPC .............. *G06N 3/063* (2013.01); *G06F 17/15* (2013.01); *G06N 3/04* (2013.01)

(58) Field of Classification Search
  CPC ........... G06N 3/063; G06N 3/04; G06F 17/15
  See application file for complete search history.

(56) References Cited

U.S. PATENT DOCUMENTS 10,902,293 B2 * 1/2021 Kamath ............... G06N 3/0454
2018/0137414 A1 * 5/2018 Du ......................... G06F 1/3206

* cited by examiner

*Primary Examiner* — David F Dunphy
(74) *Attorney, Agent, or Firm* — Knobbe, Martens, Olson & Bear, LLP (57) ABSTRACT

Embodiments disclose an artificial intelligence chip and a convolutional neural network applied to the artificial intelligence chip comprising a processor, at least one parallel computing unit, and a pooling computation unit. The method comprises: dividing a convolution task into convolution subtasks and corresponding pooling subtasks; executing convolution subtasks at different parallel computing units, and performing convolution, batch normalization, and non-linear computing operation in a same parallel computing unit; sending an execution result of each parallel computing unit from executing the convolution subtask to the pooling computation unit for executing the corresponding pooling subtask; merging executing results of the pooling computation unit from performing pooling operations on the executing results outputted by respective convolution subtasks to obtain an execution result of the convolution task. This can reduce data transport, such that operations of the convolutional neural network may be accomplished with lower power consumption and less time in an edge device.

12 Claims, 5 Drawing Sheets

HARDWARE-SOFTWARE CO-DESIGN FOR ACCELERATING DEEP LEARNING INFERENCE

TECHNICAL FIELD

Embodiments of the present disclosure relate to the field of computer technology, and more particularly relate to an AI chip and a convolutional neural network computing method applied to the AI chip.

BACKGROUND

As a deep learning technology, the convolutional neural network (CNN) has been extensively applied to various scenarios. As the convolutional neural network has a relatively high complexity, various technologies have been proposed to accelerate operations of the convolutional neural network. Currently, operations of the convolutional neural network are mainly run in a data center, so as to leverage the strong computing power of the data center to implement acceleration of the convolutional neural network. Or, operations of the convolutional neural network are accelerated by optimizing software designs corresponding to algorithms of the convolutional neural network.

SUMMARY

Embodiments of the present disclosure provide an artificial intelligence chip and a convolutional neural network computing method applied to the artificial intelligence chip.

In a first aspect, embodiments of the present disclosure provide a convolutional neural network computing method applied to an artificial intelligence chip, wherein the artificial intelligence chip comprises a processor, at least one parallel computing unit, and a pooling computation unit, the method comprising: dividing, by the processor, a convolution task into at least one convolution subtask and at least one corresponding pooling subtask, and determining a parallel computing unit corresponding to each convolution subtask, wherein the convolution task is configured for performing convolution, batch normalization, non-linear computation, and pooling operations on to-be-processed data of the convolution task, the convolution subtask is configured for performing convolution, batch normalization, and non-linear computation operations in the convolution task on to-be-processed data of the convolution subtask, and the pooling subtask is configured for performing a pooling operation in the convolution task on an execution result of the corresponding convolution subtask; transmitting, by the processor, each divided convolution subtask to the parallel computing unit corresponding to the convolution subtask, and controlling the parallel computing unit to execute the received convolution subtask; executing, by respective parallel computing units, the received convolution subtasks, and transmitting execution results as to-be-pooled data to the pooling computation unit; transmitting, by the processor, a pooling parameter of a target pooling subtask to the pooling computation unit in response to receiving indication information, which is transmitted by the parallel computing unit, indicating that the convolution subtask has been completely executed, and controlling the pooling computation unit to execute the target pooling subtask, wherein the target pooling subtask refers to a pooling subtask corresponding to the convolution subtask which corresponds to the parallel computing unit transmitting the received indication information; executing, by the pooling computation unit, the respective pooling subtasks; and transmitting execution results to the processor; and merging, by the processor, the execution results of the respective pooling subtasks received from the pooling computation unit to obtain an execution result of the convolution task.

In some embodiments, the step of dividing, by the processor, the convolution task into at least one convolution subtask and at least one corresponding pooling subtask, and determining the parallel computing unit corresponding to each convolution subtask, further comprises: dividing, by the processor, the convolution task into at least one convolution subtask and at least one corresponding pooling subtask based on a current running state of the at least one parallel computing unit, and determining the parallel computing unit corresponding to each convolution subtask.

In some embodiments, an amount of computation of each convolution subtask is a multiple of 8.

In some embodiments, the step of dividing, by the processor, the convolution task into at least one convolution subtask and at least one corresponding pooling subtask based on the current running state of the at least one parallel computing unit, and determining the parallel computing unit corresponding to each convolution subtask, further comprises: determining, by the processor, the number of parallel computing units whose current running state is an idle state in the at least one parallel computing unit as the number of idle units; dividing, by the processor, the convolution task into convolution subtasks with a number equivalent to the number of idle units, and a corresponding number of pooling subtasks; and determining, by the processor, the respective parallel computing units whose current running states are idle states, as parallel computing units corresponding to the respective convolution subtasks in the convolution subtasks with the number equivalent to the number of idle units.

In some embodiments, the to-be-processed data of the convolution task are three-dimensional data; and the step of dividing the convolution task into the convolution subtasks with the number equivalent to the number of idle units and a corresponding number of pooling subtasks comprises: dividing the to-be-processed data of the convolution task into to-be-processed data with a number equivalent to the number of idle units along a third dimension; and for each to-be-processed data in the to-be-processed data with the number equivalent to the number of idle units, generating a convolution subtask corresponding to the to-be-processed data, and generating a pooling subtask corresponding to the generated convolution subtask, wherein the generated convolution subtask is configured for performing the convolution, batch normalization, and non-linear computation operations in the convolution task on the to-be-processed data; and the generated pooling subtask is configured for executing the pooling operation in the convolution task on the executing result of the corresponding convolution subtask.

In some embodiments, the to-be-processed data of the convolution task are a depth image.

In some embodiments, the non-linear computation of the convolution task is a non-linear computation implemented by a rectified linear unit.

In some embodiments, the to-be-processed data of the convolution task are stored in a cache of the artificial intelligence chip or in a memory of an electronic device where the artificial intelligence is located.

In some embodiments, the step of executing, by respective parallel computing units, the received convolution subtasks, and transmitting execution results as to-be-pooled data to the pooling computation unit, comprises: executing, by respective parallel computing units, the received convolution subtasks, and transmitting 16-bit floating-point number format data corresponding to the execution results as to-be-pooled data to the pooling computation unit.

In some embodiments, the step of executing, by the pooling computation unit, the respective pooling subtasks; and transmitting execution results to the processor, comprises: executing, by the pooling computation unit, the respective pooling subtasks; and transmitting the 16-bit floating-point number format data corresponding to the execution results to the processor.

In a second aspect, embodiments of the present disclosure provide an artificial intelligence chip, comprising: an interface; a memory on which one or more programs are stored; and one or more processors operatively connected to the interface and the memory, configured for: dividing a convolution task into at least one convolution subtask and at least one corresponding pooling subtask, and determining a parallel computing unit corresponding to each convolution subtask, wherein the convolution task is configured for performing convolution, batch normalization, non-linear computation, and pooling operations on to-be-processed data of the convolution task, the convolution subtask is configured for performing convolution, batch normalization, and non-linear computation operations in the convolution task on to-be-processed data of the convolution subtask, and the pooling subtask is configured for performing a pooling operation in the convolution task on an execution result of the corresponding convolution subtask; transmitting each divided convolution subtask to the parallel computing unit corresponding to the convolution subtask, and controlling the parallel computing unit to execute the received convolution subtask; transmitting a pooling parameter of a target pooling subtask to the pooling computation unit in response to receiving indication information, which is transmitted by the parallel computing unit, indicating that the convolution subtask has been completely executed, and controlling the pooling computation unit to execute the target pooling subtask, wherein the target pooling subtask refers to a pooling subtask corresponding to the convolution subtask which corresponds to the parallel computing unit transmitting the received indication information; merging the execution results of the respective pooling subtasks received from the pooling computation unit to obtain an execution result of the convolution task; one or more parallel computing units operatively connected to the one or more processors and the memory, configured for: executing the received convolution subtasks, and transmitting execution results as to-be-pooled data to the pooling computation unit; and a pooling computation unit operatively connected to the one or more processors, the memory and the one or more parallel computing units, configured for: executing the respective pooling subtasks and transmitting execution results to the one or more processors.

In a third aspect, embodiments of the present disclosure provide a computer-readable memory medium, on which a computer program is stored, wherein when the computer program is executed by one or more processors, the one or more processors are caused to: divide a convolution task into at least one convolution subtask and at least one corresponding pooling subtask, and determine a parallel computing unit corresponding to each convolution subtask, wherein the convolution task is configured for performing convolution, batch normalization, non-linear computation, and pooling operations on to-be-processed data of the convolution task, the convolution subtask is configured for performing convolution, batch normalization, and non-linear computation operations in the convolution task on to-be-processed data of the convolution subtask, and the pooling subtask is configured for performing a pooling operation in the convolution task on an execution result of the corresponding convolution subtask; transmit each divided convolution subtask to the parallel computing unit corresponding to the convolution subtask, and control the parallel computing unit to execute the received convolution subtask; transmit a pooling parameter of a target pooling subtask to the pooling computation unit in response to receiving indication information, which is transmitted by the parallel computing unit, indicating that the convolution subtask has been completely executed, and control the pooling computation unit to execute the target pooling subtask, wherein the target pooling subtask refers to a pooling subtask corresponding to the convolution subtask which corresponds to the parallel computing unit transmitting the received indication information; merge the execution results of the respective pooling subtasks received from the pooling computation unit to obtain an execution result of the convolution task.

The AI chip and the convolutional neural network computing method applied to the AI chip as provided in the embodiments of the present disclosure sufficiently consider the characteristics of the convolutional neural network when designing the AI chip based on the idea of software-hardware coordinated design. The AI chip comprises at least one parallel computing unit which may perform convolution, batch normalization and non-linear computation operations, and a pooling computation unit which may perform a pooling operation. When executing a convolution task, the convolution task is first divided into a plurality of convolution subtasks and corresponding pooling subtasks based on the idea of first division and then fusion. By separately executing the convolution sub-tasks in different parallel computing units, performing convolution, batch normalization, and non-linear computing operations in a convolution subtask within a same parallel computing unit, then transmitting execution results obtained from executing, by respective parallel computing units, the convolution subtasks to the pooling computation unit, and executing pooling subtasks in the pooling computation unit, and finally, merging the execution results obtained from performing, by the pooling computation unit, the pooling operations on the execution results outputted by respective convolution subtasks, the characteristic that matrix operations are involved in all the convolution, batch normalization, and non-linear computation operations in the convolutional neural network is effectively leveraged, thereby implementing convolution, batch normalization and non-linear computation in the same parallel computing unit, which reduces data transport and may more efficiently accomplish acceleration of the convolutional neural network in an edge device at a lower power consumption with less time, without a need of support from the data center.

BRIEF DESCRIPTION OF THE DRAWINGS

Other features, objectives and advantages of the present disclosure will become more apparent through reading the detailed description of non-limiting embodiments with reference to the accompanying drawings.

DETAILED DESCRIPTION OF THE PREFERRED EMBODIMENTS

Hereinafter, the present disclosure will be described in further detail with reference to the accompanying drawings and the embodiments. It will be appreciated that the preferred embodiments described herein are only for illustration, rather than limiting the present disclosure. In addition, it should also be noted that for the ease of description, the drawings only illustrate those parts related to the present disclosure.

It needs to be noted that without conflicts, the embodiments in the present disclosure and the features in the embodiments may be combined with each other. Hereinafter, the present disclosure will be illustrated in detail with reference to the accompanying drawings in conjunction with the embodiments.

Figure 1:
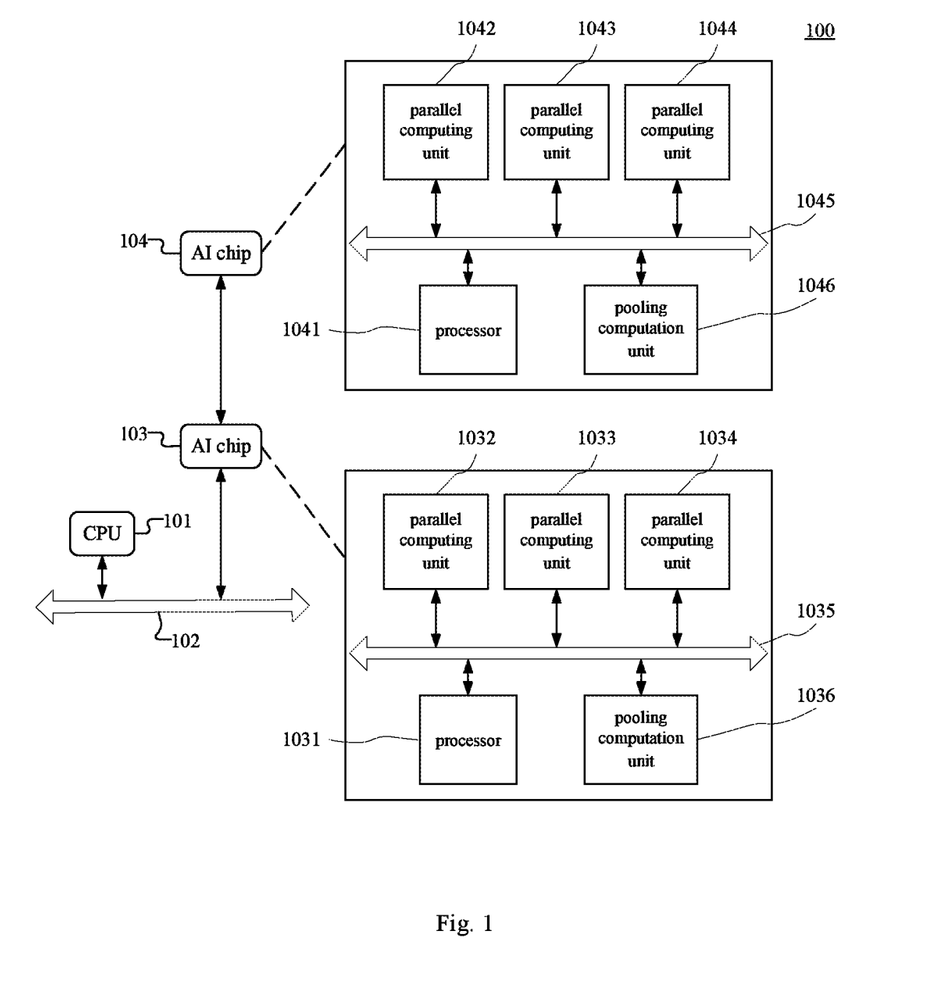
FIG. 1 is an exemplary system architecture diagram in which an embodiment of the present disclosure may be applied.

FIG. 1 is an exemplary system architecture 100 in which an embodiment of a convolutional neural network computing method applied to an AI chip may be applied according to the present disclosure.

As shown in FIG. 1, the system architecture 100 may comprise a CPU (Central Processing Unit) 101, a bus 102, and AI chips 103 and 104. The bus 102 is configured as a medium for providing a communication link between the CPU 101 and the AI chips 103 and 104. The bus 102 may include various kinds of bus types, e.g., an AMBA (Advanced Microcontroller Bus Architecture) bus, an OCP (Open Core Protocol) bus, etc.

The AI chip 103 may comprise a processor 1031, parallel computing units 1032, 1033, and 1034, a cable 1035, and a pooling computation unit 1036. The cable 1035 is configured as a medium which provides a communication link between the processor 1031, the parallel computing units 1032, 1033, and 1034, and the pooling computation unit 1036. The cable 1035 may include various cable types, e.g., a PCI bus, a PCIE bus, an AMBA bus enabling network on chip protocol, an OCP bus, and other buses which enable network on chip.

The AI chip 104 may comprise a processor 1041, parallel computing units 1042, 1043, and 1044, a cable 1045, and a pooling computation unit 1046. The cable 1045 is configured as a medium which provides a communication link between the processor 1041, the parallel computing units 1042, 1043, and 1044, and the pooling computation unit 1046. The cable 1045 may include various cable types, e.g., a PCI bus, a PCIE bus, an AMBA bus enabling network on chip protocol, an OCP bus, and other buses which enable network on chip.

It needs to be noted that the convolutional neural network computing method applied to the artificial intelligence chip as provided in the embodiment of the present disclosure is generally executed by the AI chips 103 and 104.

It should be understood that the numbers of CPUs, buses and AI chips in FIG. 1 are only schematic. Any numbers of CPUs, buses and AI chips may be provided according to implementation needs. Likewise, the numbers of the parallel computing units, cables, processors, and pooling computation units in the AI chips 103, and 104 are also only schematic. Based on implementation needs, any numbers of parallel computing units, cables, processors, and pooling computation units may be provided in the AI chips 103 and 104. Additionally, based on implementation needs, the system architecture 100 may further comprise a memory, an input device (e.g., a mouse, a keyboard, etc.), an output device (e.g., a display, a loudspeaker, etc.), and an input/output interface, etc.

As an example, the system architecture 100 may be adapted to various edge devices. For example, the system architecture 100 may be adapted to an AI camera having an AI chip or a gate machine having an AI chip, etc.

Figure 2:
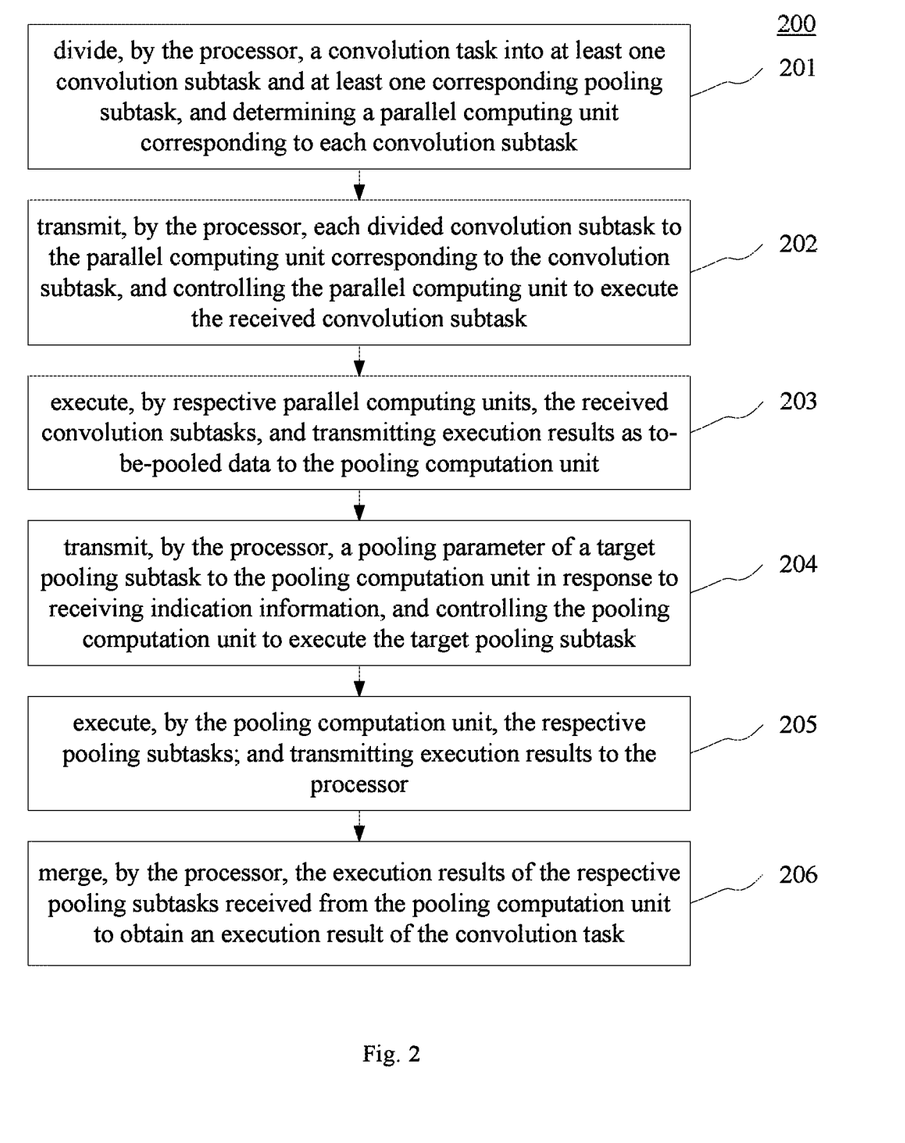
FIG. 2 is a flowchart of an embodiment of a convolutional neural network computing method applied to an AI chip according to the present disclosure.

Continue to refer to FIG. 2, which is a flowchart 200 of an embodiment of a convolutional neural network computing method applied to an artificial intelligence chip according to the present disclosure. The convolutional neural network computing method applied to an artificial intelligence chip comprises steps of:

Step 201: dividing, by the processor, a convolution task into at least one convolution subtask and at least one corresponding pooling subtask, and determining a parallel computing unit corresponding to each convolution subtask.

In this embodiment, an executing body (e.g., the AI chip in FIG. 1) of the convolutional neural network computing method applied to an artificial intelligence chip may comprise a processor, at least one parallel computing unit, and a pooling computation unit. Particularly, the parallel computing unit has an independent operation ability and is appropriate for a matrix operation. For example, a high number of adders and multipliers may be provided in the parallel computing unit. The pooling computation unit also has an independent operation ability and is appropriate for a pooling operation.

In this embodiment, upon receiving a convolution task, the processor in the AI chip may adopt various implementation manners to divide the convolution task into at least one convolution subtask and at least one corresponding pooling subtask and determine a parallel computing unit corresponding to each convolution subtask.

Here, the convolution task may be configured for performing convolution, batch normalization, non-linear computation, and pooling operations on to-be-processed data of the convolution task, the convolution subtask may be configured for performing convolution, batch normalization, and non-linear computation operations in the convolution task on to-be-processed data of the convolution subtask, and the pooling subtask may be configured for performing the pooling operation in the convolution task on an execution result of the convolution subtask corresponding to the pooling subtask.

Particularly, the convolution task may include the following data: to-be-processed data of the convolution task (e.g., a digital image having three color channels or a depth image), parameter values of various parameters (e.g., a weight parameter of a convolution kernel and a bias) of the convolution operation in the convolution task, parameter values of various parameters of a batch normalization operation in the convolution task, parameter values of various parameters of a non-linear computation operation in the convolution task, and parameter values of various parameters of the pooling operation in the convolution task.

Likewise, the convolution subtask may include the following data: to-be-processed data of the convolution subtask, parameter values of various parameters (e.g., a weight parameter a convolution kernel and a bias) of the convolution operation in the convolution subtask, parameter values of various parameters of the batch normalization operation in the convolution subtask, parameter values of various parameters of a non-linear computation operation in the convolution subtask.

Further, a pooling subtask may include the following data: to-be-pooled data of the pooling subtask, and parameter values of various parameters of the pooling operation in the pooling subtask. It needs to be noted that, here, because the convolution subtask has not been executed yet while the to-be-pooled data of the pooling subtask are an executing result of the convolution subtask corresponding to the pooling subtask, the to-be-pooled data of the pooling subtask may be set to empty or a default value.

In some optional implementation manners of this embodiment, the to-be-processed data of the convolution task may be stored in a cache of the artificial intelligence chip or in a memory of an electronic device where the artificial intelligence is located.

In some optional implementation manners of this embodiment, the to-be-processed data of the convolution task may be a depth image.

In some optional implementation manners of this embodiment, the non-linear computation of the convolution task may be non-linear computation implemented using a rectified linear unit (ReLu).

It may be understood that a sum of amounts of computations of the divided at least one convolution subtask may be equal to an amount of computation of the convolution task except the pooling operation. A sum of amounts of computations of the divided at least one pooling subtask may also be equal to an amount of computation of the pooling operations in the convolution task.

In some optional implementation manners of this embodiment, the step 201 may be carried out as follows:

The processor in the AI chip may first obtain the number of parallel computing units in the AI chip as the number of parallel computing units. Then, the processor may divide the convolution task into convolution subtasks with a number equivalent to the number of parallel computing units, and a corresponding number of pooling subtasks. For example, supposing the sum of the amounts of computations of the convolution, batch normalization, and non-linear computing operations in the convolution task is C, the amount of computation of the pooling operation in the convolution task is P, and the number of parallel computing units is N, then the convolution task may be divided into N convolution subtasks and corresponding N pooling subtasks, wherein if the remainder when C is divided by N is zero, then the amount of computation of each convolution subtask in the N convolution subtasks is the quotient when C is divided by N; if the remainder when C is divided by N is greater than zero, the amount of computation of each convolution subtask in the N–1 convolution subtasks is the quotient when C is divided by N, and the amount of computation of 1 convolution subtask is the remainder when C is divided by N.

Likewise, if the remainder when P is divided by N is zero, the amount of computation of each pooling subtask in N pooling subtasks is the quotient when P is divided by N; if the remainder when P is divided by N is greater than zero, the amount of computation of each pooling subtask in the N–1 pooling subtasks is the quotient when P is divided by N, and the amount of computation of 1 convolution subtask is the remainder when P is divided by N.

Here, C, P, and N are all positive integers. It needs to be noted that, the amount of computation of the convolution task, the amount of computation of a convolution subtask, and the amount of computation of a pooling subtask may all be determined jointly by the data size of the processed data and the computation complexity of the executed operation. Dividing the convolution task may refer to dividing the data size of to-be-processed data of the convolution task or dividing various operations to be executed by the convolution task.

In practice, the current running state of a parallel computing unit in the AI chip may be an idle state or a busy state. If the convolution task is assigned to each parallel computing unit according to the optional implementation manner above, it likely occurs that execution of the received convolution subtask has to be suspended till a busy parallel computing unit finishes the currently being executed task, which affects the speed of executing the convolution task. Therefore, in some optional implementation manners of this embodiment, the step 201 may also be performed as follows: the processor in the AI chip divides the convolution task into at least one convolution subtask and at least one corresponding pooling subtask based on a current running state of the at least one parallel computing unit, and determines a parallel computing unit corresponding to each convolution subtask. Namely, the convolution subtask should be better assigned to a parallel computing unit in an idle state.

In practice, the to-be-processed data of the convolution task are always three-dimensional data. For example, the to-be-processed data of the convolution task may be a digital image with three color channels (e.g., R, G, and B channels). For another example, the to-be-processed data of the convolution task may also be laser point cloud data having three color channels and a reflection value intensity. For another example, the to-be-processed data of the convolution task may also be a depth image having three color channels and a depth value. Further, the convolution operation is always executed on the two-dimensional plane. Therefore, in some implementation manners, the dividing, by the processor, the convolution task into at least one convolution subtask and at least one corresponding pooling subtask may also be carried out as follows: first, the processor may divide the to-be-processed data of the convolution task into at least one to-be-processed data along a third dimension; then, for each to-be-processed data in the divided at least one to-be-processed data, the processor may generate a convolution subtask corresponding to the to-be-processed data and generate a pooling subtask corresponding to the generated convolution subtask. Particularly, the generated convolution subtask refers to executing the convolution, batch normalization, and non-linear computation operations in the convolution task on the to-be-processed data; and the generated pooling subtask refers to executing the pooling operation in the convolution task on the executing result of the corresponding convolution subtask.

In some optional implementation manners of this embodiment, the amount of computation of each divided convolution subtask may be a multiple of 8, such that executing the convolution subtasks in parallel computing units may better exert the computing power of the parallel computing units.

Step 202: transmitting, by the processor, each divided convolution subtask to the parallel computing unit corresponding to the convolution subtask, and controlling the parallel computing unit to execute the received convolution subtask.

In this embodiment, the processor may transmit each convolution subtask divided in step 201 to the parallel computing unit corresponding to the convolution subtask, and control the parallel computing unit to execute the received convolution subtask.

In practice, the following data of each convolution subtask may be transmitted to the parallel computing unit corresponding to the convolution subtask: to-be-processed data of the convolution subtask, parameter values of various parameters of the convolution operation in the convolution subtask, parameter values of various parameters of the batch normalization operation in the convolution subtask, parameter values of various parameters of the non-linear computation operation in the convolution subtask.

Step 203: executing, by respective parallel computing units, the received convolution subtasks, and transmitting execution results as to-be-pooled data to the pooling computation unit.

In this embodiment, after receiving the convolution subtasks, the respective parallel computing units may execute the received convolution subtasks, and transmit execution results from executing the received convolution subtasks as to-be-pooled data to the pooling computation unit. Here, the executing, by respective parallel computing units, the received convolution subtasks refers to executing the following operations in the respective parallel computing units: first, performing convolution operations on the to-be-processed data of the received convolution subtasks based on the parameter values of various parameters of the convolution operations in the received convolution subtasks, then performing batch normalization operations on the execution results of the convolution operations as the input data for the batch normalization operations based on the parameter values of various parameters of the batch normalization operations in the received convolution subtasks, and performing non-linear computation operations on the execution results of the batch normalization operations based on the parameter values of various parameters of the non-linear computing operations in the received convolution subtasks. The results obtained from the non-linear computation operations are the execution results from executing the received convolution subtasks. Finally, the execution results are transmitted to the pooling computation unit as to-be-pooled data.

In some optional implementation manners of this embodiment, the parallel computing unit may transmit the 16-bit floating-point number format data, rather than the 32-bit floating-point number format data, corresponding to the execution result obtained after completely executing the convolution subtask to the pooling computation unit as to-be-pooled data, which further reduces the required storage space and reduces the amount of computation, thereby accelerating the speed of pooling operation.

It needs to be noted that various non-linear computing methods may be adopted to implement non-linear computation. For example, the non-linear computing method here may include, but not limited to, the following non-linear computing functions: ReLU (Rectified Linear Unit) Sigmoid function, and hyperbolic tangent (tanh) function.

It needs to be noted that how to perform convolution, batch normalization, and non-linear computation operations on the to-be-processed data is a conventional technology currently under extensive researches and applications, which is not detailed here.

Step 204: transmitting, by the processor, a pooling parameter of a target pooling subtask to the pooling computation unit in response to receiving indication information, and controlling the pooling computation unit to execute the target pooling subtask.

In this embodiment, after the received convolution subtask has been completely executed, the parallel computing unit may transmit, to the processor, indication information which indicates that the parallel computing unit has completely executed the received convolution subtask. In this way, when receiving the indication information, the processor may transmit a pooling parameter of the target pooling subtask to the pooling computation unit and control the pooling computation unit to execute the target pooling subtask. Particularly, the target pooling subtask refers to the tooling subtask corresponding to the convolution subtask which corresponds to the parallel computing unit transmitting the received indication information.

Each pooling subtask in the at least one pooling subtask divided in step 201 includes various parameters of the pooling operation, i.e., parameter values of the pooling parameters. Therefore, in step 204, the processor may transmit the pooling parameters of the target pooling subtask to the pooling computation unit.

Step 205: executing, by the pooling computation unit, the respective pooling subtasks; and transmitting execution results to the processor.

In step 203, the parallel computing unit has transmitted the to-be-pooled data to the pooling computation unit; in step 204, the processor has transmitted the pooling parameters of the pooling subtask to the pooling computation unit; therefore, the pooling computation unit may execute respective pooling subtasks under the control of the processor. Namely, for each pooling subtask divided in the step 201, the pooling computation unit may perform, under the control of the processing, a pooling operation on an execution result after the convolution subtask corresponding to the pooling subtask has been executed in the corresponding parallel computing unit to obtain the execution result of the pooling subtask, and transmit the execution result to the processor.

Here, the pooling operation may refer to various pooling operations. For example, the pooling operation may refer to max-pooling or mean-pooling, etc. The pooling parameters in the pooling subtask may comprise: a pooling algorithm, a size of pooling region, etc.

Step 206: merging, by the processor, the execution results of the respective pooling subtasks received from the pooling computation unit to obtain an execution result of the convolution task.

In this embodiment, the processor in the AI chip may merge the execution results of the respective pooling subtasks received from the pooling computation unit, wherein the merged result serves as the execution result of the convolution task. In practice, the respective execution results of the pooling computation unit are always in a form of vectors. Here, the vector obtained by merging the respective execution result vectors from the pooling computation unit may be determined as the execution result of the convolution task.

Figure 3:
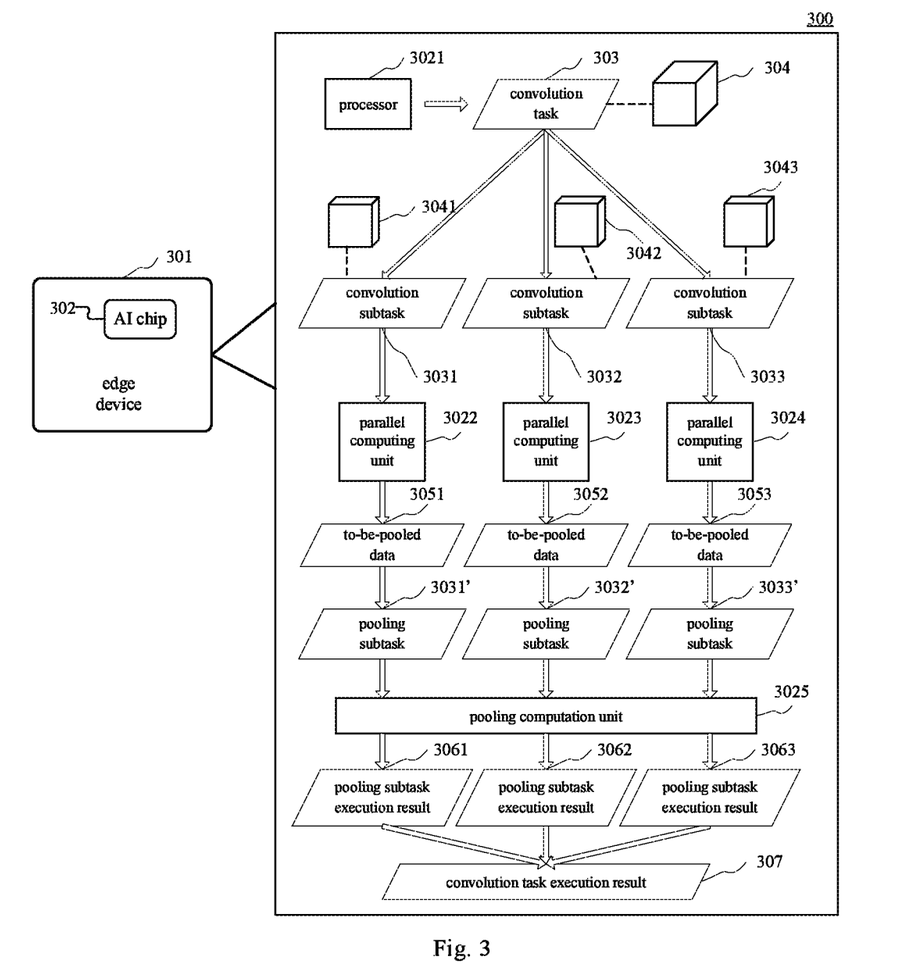
FIG. 3 is a schematic diagram of an application scenario of a convolutional neural network computing method applied to an AI chip according to the present disclosure.

Continue to refer to FIG. 3, which is a schematic diagram of an application scenario of a convolutional neural network computing method applied to an artificial intelligence chip according to the present embodiment. In the application scenario of FIG. 3, the edge device 301 is provided with an AI chip 302; the AI chip 302 comprises a processor 3021, parallel computing units 3022, 3023, and 3024, and the pooling computation unit 3025. The convolution task 303 is configured for performing convolution, batch normalization, non-linear computation, and pooling operations on the 24×24×24 to-be-processed data 304. During the process of executing, by the AI chip 302, the convolution task 303, first, the processor 3021 divides the convolution task 303 into three convolution subtasks 3031, 3032, and 3033, and corresponding three pooling subtasks 3031', 3032', and 3033'; the to-be-processed data 304 are divided into three segments of to-be-processed data 3041, 3042, and 3043, wherein the to-be-processed data 3041 are the 24×24×8 data obtained by segmenting the to-be-processed data 304 along a third dimension, which are the first 8 data of the to-be-processed data 304; the to-be-processed data 3042 are the 24×24×8 data obtained by segmenting the to-be-processed data 304 along the third dimension, which are the middle 8 data of the to-be-processed data 304; and the to-be-processed data 3043 are 24×24×8 data obtained by segmenting the to-be-processed data 304 along the third dimension, which are the last 8 data of the to-be-processed data 304. The convolution subtask 3031 is configured for performing convolution, batch normalization, and non-linear computation operations on the to-be-processed data 3041, the convolution subtask 3032 is configured for performing convolution, batch normalization, and non-linear computation operations in the convolution task on the to-be-processed data 3042, and the convolution subtask 3033 is configured for performing convolution, batch normalization, and non-linear computation operations in the convolution task on the to-be-processed data 3043. The pooling subtask 3031' is configured for performing the pooling operation in the convolution task on the execution result of the convolution subtask 3031. The pooling subtask 3032' is configured for performing the pooling operation in the convolution task on the execution result of the convolution subtask 3032. The pooling subtask 3033' is configured for performing the pooling operation in the convolution task on the execution result of the convolution subtask 3033. Then, the processor 3021 transmits the convolution subtasks 3031, 3032, and 3033 to the parallel computing units 3022, 3023, and 3024, respectively; and the parallel computing units 3022, 3023, and 3024 execute the convolution subtasks 3031, 3032, and 3033, respectively, to obtain to-be-pooled data 3051, 3052, and 3053, respectively. The processor transmits the pooling subtasks 3031', 3032', and 3033 to the pooling computation unit respectively, and the to-be-pooled data 3051, 3052, and 3053 respectively as to-be-processed data of the pooling subtasks 3031', 3032'. And the pooling computation unit executes the pooling subtasks 3031', 3032', and 3033', respectively, to obtain the pooling subtask execution results 3061, 3062, and 3063. Finally, the processor merges the pooling subtask execution results 3061, 3062, 3063 to obtain the convolution task execution result 307 of the convolution task 303.

The method provided in the above embodiments of the present disclosure sufficiently consider the characteristics of the convolutional neural network. When executing a convolution task, the convolution task is divided into a plurality of convolution subtasks and corresponding pooling subtasks based on the idea of first division and then fusion. By separately executing the convolutional sub-tasks in different parallel computing units, performing convolution, batch normalization, and non-linear computing operations in a convolution subtask within a same parallel computing unit, then transmitting execution results obtained from executing, by respective parallel computing units, the convolution subtasks to the pooling computation unit, and executing pooling subtasks in the pooling computation unit, and finally, merging the execution results obtained from performing, by the pooling computation unit, the pooling operations on the execution results outputted by respective convolution subtasks, the characteristic that all the convolution, batch normalization, and non-linear computation operations in the convolutional neural network involve matrix operation is effectively leveraged, thereby implementing convolution, batch normalization and non-linear computation in the same parallel computing unit, which reduces data transport and may more efficiently accomplish acceleration of the convolutional neural network in an edge device at a lower power consumption with less time consumption, without a need of support from the data center.

Figure 4:
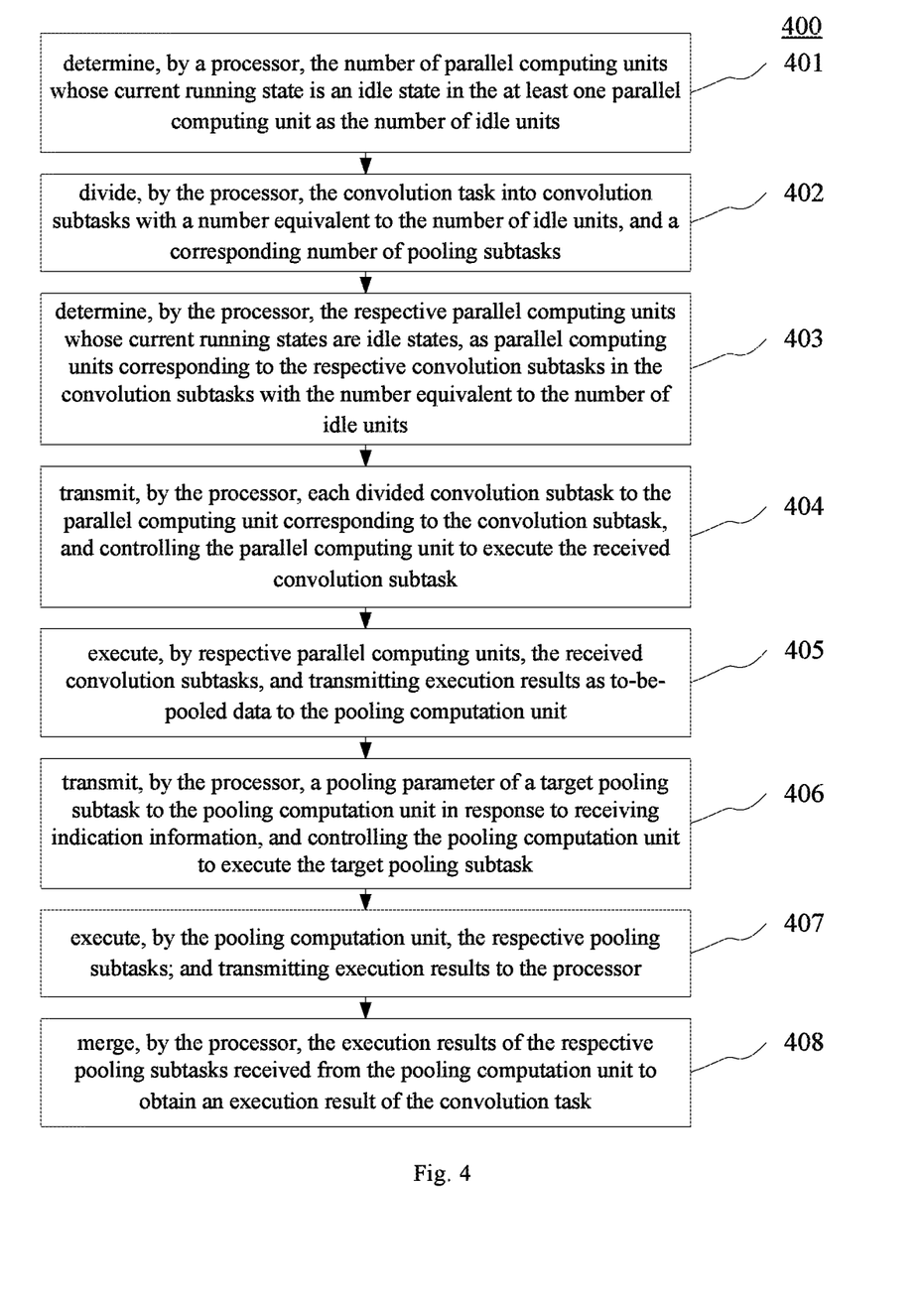
FIG. 4 is a flowchart of another embodiment of a convolutional neural network computing method applied to an AI chip according to the present disclosure.

Continue to refer to FIG. 4, which is a flowchart 400 of another embodiment of a convolutional neural network computing method applied to an artificial intelligence chip. The flow 400 of the convolutional neural network computing method applied to an artificial intelligence chip comprises steps of:

Step 401: determining, by a processor, the number of parallel computing units whose current running state is an idle state in the at least one parallel computing unit as the number of idle units.

In this embodiment, an executing body (e.g., an AI chip in FIG. 1) of the convolutional neural network computing method applied to an artificial intelligence chip may comprise a processor, at least one parallel computing unit, and a pooling computation unit. Particularly, the parallel computing unit has an independent operation ability and is appropriate for a matrix operation. For example, a high number of adders and multipliers may be provided in the parallel computing unit. The pooling computation unit also has an independent operation ability and is appropriate for a pooling operation.

In this embodiment, when receiving the convolution task, the processor in the AI chip may determine the number of parallel computing units whose current running state is an idle state in the at least one parallel computing unit as the number of idle units.

Step 402: dividing, by the processor, the convolution task into convolution subtasks with a number equivalent to the number of idle units, and a corresponding number of pooling subtasks.

In this embodiment, the processor in the AI chip may adopt various implementation manners to divide the received convolution task into convolution subtasks with a number equivalent to the number of idle units determined in step 401, and a corresponding number of pooling subtask.

In practice, the to-be-processed data of the convolution task are always three-dimensional data. For example, the to-be-processed data of the convolution task may be a digital image with three color channels (e.g., R, G, and B channels). For another example, the to-be-processed data of the convolution task may also be laser point cloud data having three color channels and a reflection value intensity. For another example, the to-be-processed data of the convolution task may also be a depth image having three color channels and a depth value. Further, the convolution operation is always executed on a two-dimensional plane. Therefore, in some implementation manners, the dividing, by the processor, the convolution task into convolution subtasks with a number equivalent to the number of idle units and the corresponding number of pooling subtasks may also be carried out as follows: first, the processor may divide the to-be-processed data of the convolution task into to-be-processed data with a number equivalent to the number of idle units along a third dimension; then, for each to-be-processed data in the to-be-processed data with the number equivalent to the number of idle units, the processor may generate a convolution subtask corresponding to the to-be-processed data and a corresponding pooling subtask. Particularly, the generated convolution subtask is configured for performing convolution, batch normalization, and non-linear computation operations in the convolution task on the to-be-processed data; and the generated pooling subtask is configured for executing the pooling operation in the convolution task on the executing result of the generated convolution subtask.

Step 403: determining, by the processor, the respective parallel computing units whose current running states are idle states, as parallel computing units corresponding to the respective convolution subtasks in the convolution subtasks with the number equivalent to the number of idle units.

Namely, a convolution subtask is assigned to each parallel computing unit which is currently in an idle state so as to complete the convolution task as quickly as possible.

Step 404: transmitting, by the processor, each divided convolution subtask to the parallel computing unit corresponding to the convolution subtask, and controlling the parallel computing unit to execute the received convolution subtask.

Step 405: executing, by respective parallel computing units, the received convolution subtasks, and transmitting execution results as to-be-pooled data to the pooling computation unit.

Step 406: transmitting, by the processor, a pooling parameter of a target pooling subtask to the pooling computation unit in response to receiving indication information, and controlling the pooling computation unit to execute the target pooling subtask.

Step 407: executing, by the pooling computation unit, the respective pooling subtasks; and transmitting execution results to the processor.

Step 408: merging, by the processor, the execution results of the respective pooling subtasks received from the pooling computation unit to obtain an execution result of the convolution task.

In this embodiment, specific operations of the step 404, the step 405, the step 406, the step 407, and the step 408 are substantially identical to the operations of the step 202, the step 203, the step 204, the step 205, and the step 206 in the embodiment of FIG. 2, which are thus not detailed here.

It may be seen from FIG. 4 that compared with the embodiment in FIG. 2, the convolutional neural network computing method applied to the artificial intelligence chip in this embodiment assigns convolution subtasks to respective idle parallel computing units when dividing the convolution task, such that it is unnecessary to suspend execution of the convolution task till a busy parallel computing unit completely executes the current task. In this way, the execution speed of the convolution task is further accelerated.

Hereinafter, refer to FIG. 5, which is a structural schematic diagram of a computer system 500 of an edge device adapted for implementing the embodiments of the present disclosure. The edge device shown in FIG. 5 is only an example, which should not constitute any limitation to the function and use scope of the embodiments of the present disclosure.

Figure 5:
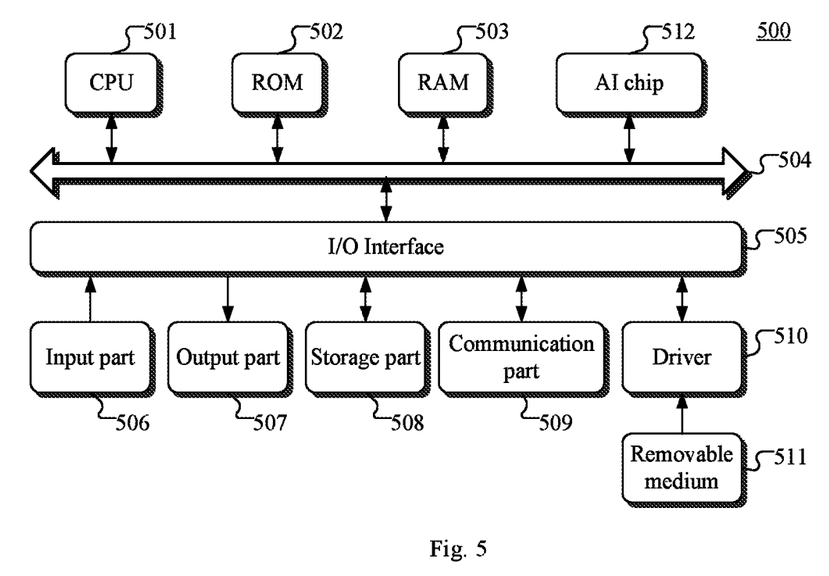
FIG. 5 is a structural schematic diagram of a computer system of an edge device adapted for implementing the embodiments of the present disclosure.

As shown in FIG. 5, the computer system 500 comprises one or more central processing units (CPU) 501 which may perform various kinds of appropriate actions and processing according to computer program stored in a read-only memory (ROM) 502 or a program loaded into the random-access memory (RAM) 503 from a memory part 508. In RAM 503, there may also store various kinds of programs and data needed for operations of the system 500. The CPU 501 may also perform data processing and analysis via at least one artificial intelligence chip 512. The CPU 501, ROM 502, RAM 503, and the artificial intelligence chip 512 are connected with each other via a bus 504. The input/output (I/O) interface 505 may also be connected to the bus 504.

A plurality of components are connected to the I/O interface 605, comprising: an input part 606 including a keyboard, a mouse, and etc.; an output part 607 including such as a CRT (Cathode Ray Tube), an LCD (Liquid Crystal Display), and a loudspeaker, etc.; a memory part 608 including a hard disk, etc.; and a communication part 609 including a network interface card such as a LAN (Local Area Network) card, a modem, etc. The communication part 609 performs communication processing via a network such as the Internet. A driver 610 is also connected to the I/O interface 605 as needed. A removable medium 611, such as a magnetic disk, an optical disk, a magneto-optical disk, and a semiconductor memory, etc., is mounted on the driver 610 as needed, so as to facilitate the computer program read therefrom to be installed in the memory part 608.

Particularly, according to the embodiments of the present disclosure, the processes described above with reference to the flow diagrams may be implemented as computer software programs. For example, an embodiment of the present disclosure includes a computer program product that has a computer program carried on a computer-readable medium, the computer program containing computer codes for executing the methods shown in the flow diagrams. In such an embodiment, the computer programs may be downloaded and installed from a network through the communication part 609 and/or installed from the removable medium 611. When being executed by the one or more processors 601, the computer programs execute the functions limited in the methods of the present disclosure. It needs to be noted that the computer readable medium as described in the present disclosure may be a computer-readable signal medium or a computer-readable storage medium or any combination thereof. The computer-readable storage medium, for example, may be, but not limited to, an electrical, magnetic, optical, electromagnetic, infrared, or semiconductor system, apparatus or device, or any combination thereof. More specific examples of the computer-readable storage medium may include, but not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof. In the present disclosure, the computer-readable storage medium may be any tangible medium containing or storing a program that may be used by an instruction executing system, apparatus, or device or used in combination therewith. Further, in the present disclosure, the computer-readable signal medium may include a data signal propagated in a baseband or as part of a carrier, in which computer-readable program code are carried. A data signal propagated in such a way may assume a plurality of forms, including, but not limited to, an electromagnetic signal, an optical signal, or any appropriate combination thereof. The computer-readable signal medium may also be any computer-readable medium other than the computer-readable storage medium, which computer-readable medium may send, propagate or transmit the programs used by the instruction executing system, apparatus or device or used in combination therewith. The program code embodied on the computer-readable medium may be transmitted using any appropriate medium, including, but not limited to: wireless, wired, cable, RF, etc., or any appropriate combination thereof.

One or more programming languages or a combination thereof may be used to compile the computer program codes for executing the operations in the present disclosure. The programming languages include object-oriented programming languages (such as Java, Smalltalk, C++), and also include conventional procedural programming languages (such as "C" language or similar programming languages). The program code may be completely executed on a user computer, partially executed on the user computer, executed as an independent software packet, or partially executed on the user computer while partially executed on the remote computer, or completely executed on the remote computer or the server. In a scene associated with a remote computer, the remote computer may be connected to the user computer via any kind of network (including a local area network (LAN) or a wide area network (WAN), or may be connected to the external computer (for example, connected via the Internet through an Internet Service Provider).

The flow diagrams and block diagrams in the drawings illustrate system architectures, functions, and operations possibly implemented by the system, method, and computer program product of various embodiments of the present disclosure. At this point, each block in the flow diagrams or block diagrams may represent a module, a program segment, or part of codes, wherein the module, program segment, or part of codes contain one or more executable instructions for implementing a prescribed logic function. It should also be noted that in some alternative implementations, the functions annotated in the blocks may also occur in a sequence different from what is indicated in the drawings. For example, two successively expressed blocks actually may be executed substantially in parallel, and they may be sometimes executed in a reverse order, dependent on the functions involved. It should also be noted that each block in the block diagrams and/or flow diagrams and a combination of blocks in the block diagrams and/or flow diagrams may be implemented by a specific hardware-based system for executing a prescribed function or operation, or may be implemented by a combination of specific hardware and computer instructions.

As another aspect, the present disclosure further provides a computer-readable memory medium, on which a computer program is stored, wherein when the computer program is executed by one or more processors, the one or more processors are caused to: divide a convolution task into at least one convolution subtask and at least one corresponding pooling subtask, and determine a parallel computing unit corresponding to each convolution subtask, wherein the convolution task is configured for performing convolution, batch normalization, non-linear computation, and pooling operations on to-be-processed data of the convolution task, the convolution subtask is configured for performing convolution, batch normalization, and non-linear computation operations in the convolution task on to-be-processed data of the convolution subtask, and the pooling subtask is configured for performing a pooling operation in the convolution task on an execution result of the corresponding convolution subtask; transmit each divided convolution subtask to the parallel computing unit corresponding to the convolution subtask, and control the parallel computing unit to execute the received convolution subtask; transmit a pooling parameter of a target pooling subtask to the pooling computation unit in response to receiving indication information, which is transmitted by the parallel computing unit, indicating that the convolution subtask has been completely executed, and control the pooling computation unit to execute the target pooling subtask, wherein the target pooling subtask refers to a pooling subtask corresponding to the convolution subtask which corresponds to the parallel computing unit transmitting the received indication information; merge the execution results of the respective pooling subtasks received from the pooling computation unit to obtain an execution result of the convolution task.

As a further aspect, the present disclosure further provides an artificial intelligence chip, comprising: an interface; a memory on which one or more programs are stored; and one or more processors operatively connected to the interface and the memory, configured for: dividing a convolution task into at least one convolution subtask and at least one corresponding pooling subtask, and determining a parallel computing unit corresponding to each convolution subtask, wherein the convolution task is configured for performing convolution, batch normalization, non-linear computation, and pooling operations on to-be-processed data of the convolution task, the convolution subtask is configured for performing convolution, batch normalization, and non-linear computation operations in the convolution task on to-be-processed data of the convolution subtask, and the pooling subtask is configured for performing a pooling operation in the convolution task on an execution result of the corresponding convolution subtask; transmitting each divided convolution subtask to the parallel computing unit corresponding to the convolution subtask, and controlling the parallel computing unit to execute the received convolution subtask; transmitting a pooling parameter of a target pooling subtask to the pooling computation unit in response to receiving indication information, which is transmitted by the parallel computing unit, indicating that the convolution subtask has been completely executed, and controlling the pooling computation unit to execute the target pooling subtask, wherein the target pooling subtask refers to a pooling subtask corresponding to the convolution subtask which corresponds to the parallel computing unit transmitting the received indication information; merging the execution results of the respective pooling subtasks received from the pooling computation unit to obtain an execution result of the convolution task; one or more parallel computing units operatively connected to the one or more processors and the memory, configured for: executing the received convolution subtasks, and transmitting execution results as to-be-pooled data to the pooling computation unit; and a pooling computation unit operatively connected to the one or more processors, the memory and the one or more parallel computing units, configured for: executing the respective pooling subtasks and transmitting execution results to the one or more processors.

What have been described above are only preferred embodiments of the present disclosure and an illustration of the technical principle as exerted. Those skilled in the art should understand, the scope of the present disclosure is not limited to the technical solution resulting from a specific combination of the technical features, and meanwhile, should also cover other technical solutions resulting from any combination of the technical features or their equivalent features without departing from the inventive concept. For example, a technical solution resulting from mutual substitution of the features and those technical features disclosed (not limited to) in the present disclosure with similar functions.

What is claimed is:

1. A convolutional neural network computing method applied to an artificial intelligence chip, wherein the artificial intelligence chip comprises a processor, at least one parallel computing unit, and a pooling computation unit, the method comprising:
    dividing, by the processor, a convolution task into at least one convolution subtask and at least one corresponding pooling subtask, and determining a parallel computing unit corresponding to each convolution subtask, wherein the convolution task is configured for performing convolution, batch normalization, non-linear computation, and pooling operations on to-be-processed data of the convolution task, the convolution subtask is configured for performing convolution, batch normalization, and non-linear computation operations in the convolution task on to-be-processed data of the convolution subtask, and the pooling subtask is configured for performing a pooling operation in the convolution task on an execution result of the corresponding convolution subtask;

transmitting, by the processor, each divided convolution subtask to the parallel computing unit corresponding to the convolution subtask, and controlling the parallel computing unit to execute the received convolution subtask;

executing, by respective parallel computing units, the received convolution subtasks, and transmitting execution results as to-be-pooled data to the pooling computation unit;

transmitting, by the processor, a pooling parameter of a target pooling subtask to the pooling computation unit in response to receiving indication information, which is transmitted by the parallel computing unit, indicating that the convolution subtask has been completely executed, and controlling the pooling computation unit to execute the target pooling subtask, wherein the target pooling subtask refers to a pooling subtask corresponding to the convolution subtask which corresponds to the parallel computing unit transmitting the received indication information;

executing, by the pooling computation unit, the respective pooling subtasks; and transmitting execution results to the processor; and merging, by the processor, the execution results of the respective pooling subtasks received from the pooling computation unit to obtain an execution result of the convolution task.

2. The method according to claim 1, wherein the dividing, by the processor, the convolution task into at least one convolution subtask and at least one corresponding pooling subtask, and determining the parallel computing unit corresponding to each convolution subtask, further comprises:

dividing, by the processor, the convolution task into at least one convolution subtask and at least one corresponding pooling subtask based on a current running state of the at least one parallel computing unit, and determining the parallel computing unit corresponding to each convolution subtask.

3. The method according to claim 2, wherein an amount of computation of each convolution subtask is a multiple of 8.

4. The method according to claim 3, wherein the dividing, by the processor, the convolution task into at least one convolution subtask and at least one corresponding pooling subtask based on the current running state of the at least one parallel computing unit, and determining the parallel computing unit corresponding to each convolution subtask, further comprises:

determining, by the processor, the number of parallel computing units whose current running state is an idle state in the at least one parallel computing unit as the number of idle units;

dividing, by the processor, the convolution task into convolution subtasks with a number equivalent to the number of idle units, and a corresponding number of pooling subtasks; and determining, by the processor, the respective parallel computing units whose current running states are idle states, as parallel computing units corresponding to the respective convolution subtasks in the convolution subtasks with the number equivalent to the number of idle units.

5. The method according to claim 4, wherein the to-be-processed data of the convolution task are three-dimensional data; and the dividing the convolution task into the convolution subtasks with the number equivalent to the number of idle units and a corresponding number of pooling subtasks comprises:

dividing the to-be-processed data of the convolution task into to-be-processed data with a number equivalent to the number of idle units along a third dimension; and for each to-be-processed data in the to-be-processed data with the number equivalent to the number of idle units, generating a convolution subtask corresponding to the to-be-processed data, and generating a pooling subtask corresponding to the generated convolution subtask, wherein the generated convolution subtask is configured for performing the convolution, batch normalization, and non-linear computation operations in the convolution task on the to-be-processed data; and the generated pooling subtask is configured for executing the pooling operation in the convolution task on the executing result of the corresponding convolution subtask.

6. The method according to claim 5, wherein the to-be-processed data of the convolution task are a depth image.

7. The method according to claim 6, wherein the non-linear computation of the convolution task is a non-linear computation implemented by a rectified linear unit.

8. The method according to claim 7, wherein the to-be-processed data of the convolution task are stored in a cache of the artificial intelligence chip or in a memory of an electronic device where the artificial intelligence is located.

9. The method according to claim 8, wherein executing, by respective parallel computing units, the received convolution subtasks, and transmitting execution results as to-be-pooled data to the pooling computation unit, comprises:

executing, by respective parallel computing units, the received convolution subtasks, and transmitting 16-bit floating-point number format data corresponding to the execution results as to-be-pooled data to the pooling computation unit.

10. The method according to claim 9, wherein the executing, by the pooling computation unit, the respective pooling subtasks; and transmitting execution results to the processor, comprises:

executing, by the pooling computation unit, the respective pooling subtasks; and transmitting the 16-bit floating-point number format data corresponding to the execution results to the processor.

11. An artificial intelligence chip, comprising:
an interface;
a memory on which one or more programs are stored; and
one or more processors operatively connected to the interface and the memory, configured for: dividing a convolution task into at least one convolution subtask and at least one corresponding pooling subtask, and determining a parallel computing unit corresponding to each convolution subtask, wherein the convolution task is configured for performing convolution, batch normalization, non-linear computation, and pooling operations on to-be-processed data of the convolution task, the convolution subtask is configured for performing convolution, batch normalization, and non-linear computation operations in the convolution task on to-be-processed data of the convolution subtask, and the pooling subtask is configured for performing a pooling operation in the convolution task on an execution result of the corresponding convolution subtask; transmitting each divided convolution subtask to the parallel computing unit corresponding to the convolution subtask, and controlling the parallel computing unit to execute the received convolution subtask; transmitting a pooling parameter of a target pooling subtask to the pooling computation unit in response to receiving indication information, which is transmitted by the parallel computing unit, indicating that the convolution subtask has been completely executed, and controlling the pooling computation unit to execute the target pooling subtask, wherein the target pooling subtask refers to a pooling subtask corresponding to the convolution subtask which corresponds to the parallel computing unit transmitting the received indication information; merging the execution results of the respective pooling subtasks received from the pooling computation unit to obtain an execution result of the convolution task;

one or more parallel computing units operatively connected to the one or more processors and the memory, configured for: executing the received convolution subtasks, and transmitting execution results as to-be-pooled data to the pooling computation unit; and a pooling computation unit operatively connected to the one or more processors, the memory and the one or more parallel computing units, configured for: executing the respective pooling subtasks and transmitting execution results to the one or more processors.

12. A computer readable storage medium, on which a computer program is stored, wherein when the computer program is executed by one or more processors, the one or more processors are caused to: divide a convolution task into at least one convolution subtask and at least one corresponding pooling subtask, and determine a parallel computing unit corresponding to each convolution subtask, wherein the convolution task is configured for performing convolution, batch normalization, non-linear computation, and pooling operations on to-be-processed data of the convolution task, the convolution subtask is configured for performing convolution, batch normalization, and non-linear computation operations in the convolution task on to-be-processed data of the convolution subtask, and the pooling subtask is configured for performing a pooling operation in the convolution task on an execution result of the corresponding convolution subtask; transmit each divided convolution subtask to the parallel computing unit corresponding to the convolution subtask, and control the parallel computing unit to execute the received convolution subtask; transmit a pooling parameter of a target pooling subtask to the pooling computation unit in response to receiving indication information, which is transmitted by the parallel computing unit, indicating that the convolution subtask has been completely executed, and control the pooling computation unit to execute the target pooling subtask, wherein the target pooling subtask refers to a pooling subtask corresponding to the convolution subtask which corresponds to the parallel computing unit transmitting the received indication information; merge the execution results of the respective pooling subtasks received from the pooling computation unit to obtain an execution result of the convolution task.

* * * * *